(No Model.)

W. C. CARD.
HAY LOADER.

No. 512,096. Patented Jan. 2, 1894.

Witnesses
A. L. Hobbie
Otto F. Barthel

Inventor
Warren C. Card
By his Attys.

UNITED STATES PATENT OFFICE.

WARREN C. CARD, OF MEAD, MICHIGAN.

HAY-LOADER.

SPECIFICATION forming part of Letters Patent No. 512,096, dated January 2, 1894.

Application filed August 15, 1893. Serial No. 483,164. (No model.)

*To all whom it may concern:*

Be it known that I, WARREN C. CARD, a citizen of the United States, residing at Mead, in the county of Macomb and State of Michigan, have invented certain new and useful Improvements in Hay-Loaders, of which the following is a specification, reference being had therein to the accompanying drawings.

The invention consists in the peculiar construction of a derrick frame adapted to be secured to the rear end of a hay wagon, a derrick thereon and means for raising and swinging the boom of the derrick to any desired point to and from the wagon, and hay hooks operated from the derrick, all as more fully hereinafter described.

Figure 1:
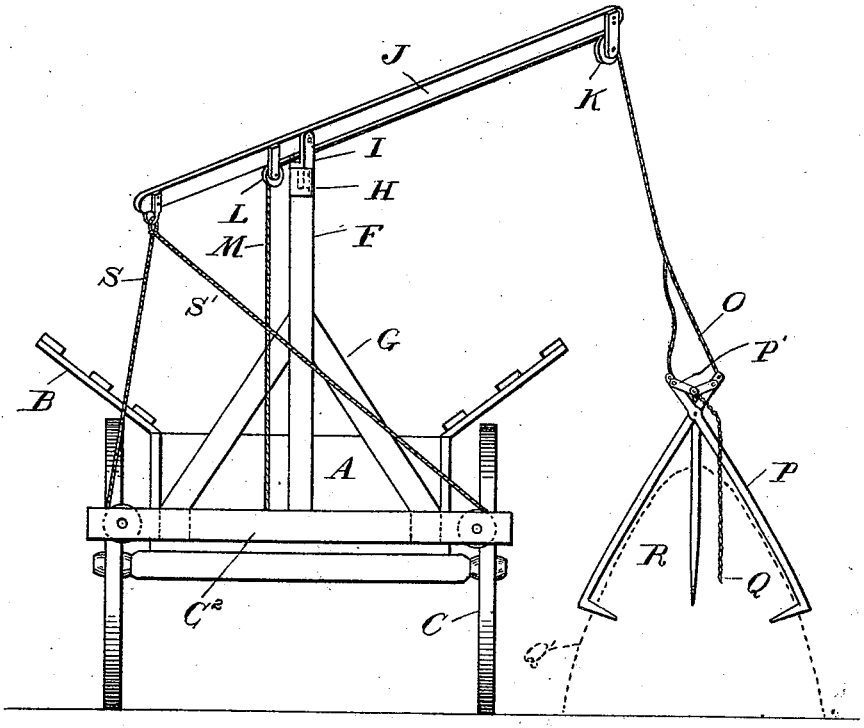
Figure 2:
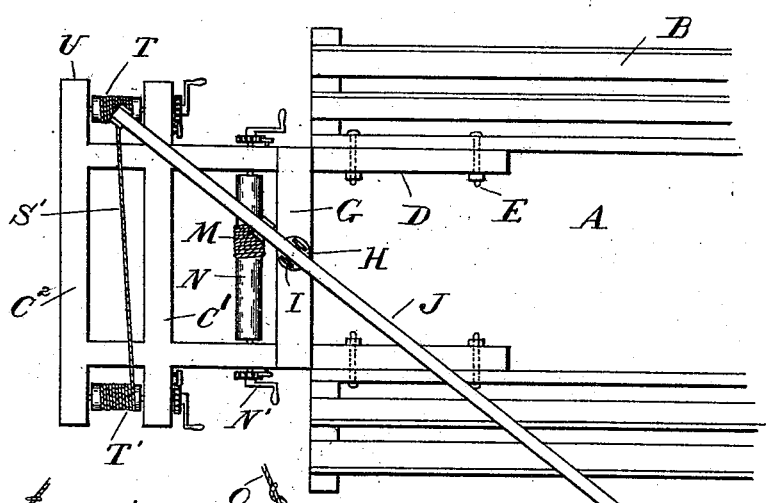
Figure 3:
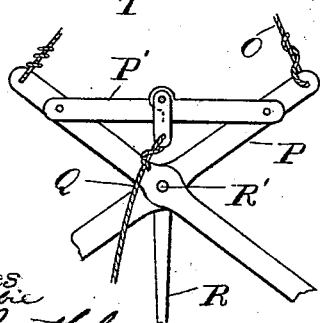

In the drawings, Figure 1 is a rear elevation of my improved device, showing it as applied in use. Fig. 2 is a top plan view thereof, and Fig. 3, is an enlarged elevation of the tripping device for the hay hooks.

A shows the wagon box, B the hay rack thereon, C the wheels; these parts being of usual construction.

In using my device I usually lift off the tail board and attach the derrick frame to the rear of the wagon.

The frame consists of the longitudinal timbers D and cross timbers C' C², the longitudinal timbers extending inwardly inside of the wagon box and being bolted thereto at the sides by means of bolts E.

F is a post or mast secured to the frame at the rear edge of the wagon and in such relation to the rack that it may form the rear ladder or support for the hay at the end of the load. This post I support by means of suitable braces G extending from the longitudinal timbers D against the sides of the post. The post is provided at the top with a suitable cap H on which is supported the turntable I.

J is a boom pivoted in the turntable I. The outer end of the boom is provided with a sheave K and near its supporting point in rear of the turntable is a second sheave L. Over these sheaves passes the hoisting rope M which at one end is secured to the windlass N, which is journaled between the longitudinal timbers D beneath the sheave L and provided with suitable actuating handles N' at each end. The rope at its free end connects by means of the two ropes or cords O with the ends of the pivoted arms P which together form the hay hooks. These hooks may be held open by means of the levers P', pivoted at one end to the upper end of the arms P and at their inner ends pivoted together by a rule joint.

Q is a tripping cord by means of which the locking levers P' may be tripped, allowing the hooked arms P to approach each other and engage into the hay cock. Shown at Q'. The hay is prevented from turning in the hooks by means of the downwardly projecting point R suspended from the pivot R' of the hook. After the arms P are engaged into the hay cock if the operator turns the windlass N it will lift the hay hooks drawing the arms thereof together and raising the hay. To the end of the boom are secured the boom actuating ropes S S' which are connected respectively to the windlasses T T', which are pivoted at the side of the derrick frame in extensions U of the cross-bars C' C². The load being supported in the hooks and raised to the outer end of the boom it may now be shifted to any desired point by turning the one or the other of the windlasses T T', which will not only raise it laterally but raise it to any desired point so as to drop it on the load.

The device is not only used in loading and unloading hay but may be attached to any wagon for shifting other articles to and from the box.

What I claim is—

1. In a hay loader, the combination with a frame, of a post thereon, a turntable on the post, a boom pivoted on said turntable, a hoisting rope on the boom, a hay hook secured on one end of the hoisting rope, a windlass on the frame to which the opposite end of the hoisting rope is secured, ropes secured to the rear end of the boom, and windlasses on the opposite sides of the frame to which the ropes are secured, substantially as described.

2. In a hay loader, the combination with a movable support, of a frame secured thereon, a post on the frame, a turntable on the post, a boom pivoted on said turntable, a hoisting rope on the boom, a hay hook secured to one end of the hoisting rope, a windlass on the frame to which the opposite end of the hoisting rope is secured, and flexible means connected to the inner end of the boom and adjustably secured to opposite sides of the movable support for rocking and adjusting the boom on its pivotal point, substantially as described.

3. In a hay loader, the combination of a frame having longitudinal and cross timbers, the longitudinal sills having means for securing it to the wagon box, of a post secured centrally to the frame, a boom swiveled at the top thereof, the sheaves L and K on the boom, the cord passing over the sheaves, the hay hooks suspended from the cord, a trip for the hooks, cords connected to the rear end of the boom, and a windlass on each side of the frame to which said cords are secured, substantially as described.

In testimony whereof I affix my signature in presence of two witnesses.

WARREN C. CARD.

Witnesses:
M. B. O'DOGHERTY,
OTTO F. BARTHEL.